H. R. PALMER.
MEANS FOR PROTECTING BATTERY ANODES.
APPLICATION FILED NOV. 28, 1919.

1,376,034. Patented Apr. 26, 1921.

Inventor
HERBERT R. PALMER
By Louis F. Griswold.
Atty.

UNITED STATES PATENT OFFICE.

HERBERT R. PALMER, OF CLEVELAND HEIGHTS, OHIO, ASSIGNOR OF ONE-HALF TO CHARLES A. BURKE, OF CLEVELAND, OHIO.

MEANS FOR PROTECTING BATTERY-ANODES.

1,376,034.

Specification of Letters Patent.

Patented Apr. 26, 1921.

Application filed November 28, 1919. Serial No. 341,289.

*To all whom it may concern:*

Be it known that I, HERBERT R. PALMER, a citizen of the United States, residing at Cleveland Heights, in the county of Cuyahoga and State of Ohio, have invented certain new and useful Improvements in Means for Protecting Battery-Anodes, of which the following is a specification.

This invention relates to dry-cell batteries, and more particularly to the element which constitutes the positive pole or anode of the cell.

It is well known to those familiar with the electric battery art, that cells of this class, while not in use, deteriorate by age, and that what is commonly known as the "shelf-life" of a dry-cell is limited. This has been found to be due to a continuous chemical action of the electrolyte on the metal of the anode when the cell is inert. The electrolyte, in cells as heretofore constructed, being in direct contact with the metal causes the decay or deterioration of the anode, even while the battery is inactive or not in use.

The primary object of the present invention is to prolong indefinitely the "shelf-life" of a dry-cell by arresting the action of the electrolyte on the anode while the cell is inactive.

I realize this object by the provision of an anode so prepared or treated, that it resists the chemical action of the electrolyte when the battery is not in use, but does not affect the energy of the cell, as hereinafter set forth and pointed out definitely in the claim.

Figure 1:
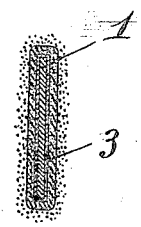
Figure 2:
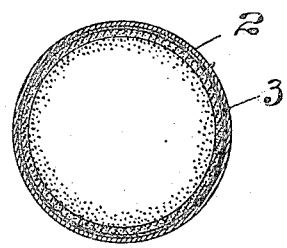

In the accompanying drawing, Figure 1 represents, in section, a flat anode plate entirely covered with a protective coating, and Fig. 2 is a section of a cylindrical anode having a protective coating on the active side thereof. In both of the figures the coating element is shown exaggerated, said coating in practice being a thin film.

The anode element of batteries of this class is generally composed of zinc. In ordinary round cells it forms the container, the inner surface only being exposed to the electrolyte, and in certain forms of flat cells the anode is embedded in the depolarizing element and has its entire surface area in contact with the electrolyte with which the depolarizer is saturated.

If the surface of the zinc member of the anode is protected while the cell is inert no deteriorating action can take place. Therefore, in carrying out my invention or discovery, I cover the entire plate 1, or that portion of the surface which becomes active when the cell is energized, this surface being the inner surface of the cylindrical plate 2, with a thin coating 3. This coating when applied is in a liquid state, of thin constituency, and is deposited uniformly in a thin film over the entire active surface of the zinc, either by immersion of the zinc in said liquid, or by flowing the liquid over the active surface, or it may be applied with a soft brush, and then, preferably, baked. The properties of the coating are such that, when the cell is inert, it is impervious to moisture or to the action of the electrolytic medium, but when the battery is connected for use the electro-chemical action transforms the coating into a conductor, and the cell becomes energized.

I have found by actual experiments, covering a considerable period of time, that there has been no perceptible change in anodes thus coated and embodied in battery cells, while in cells provided with uncoated anodes a noticeable deterioration has occurred within a comparatively short duration of time.

Having described my invention, what I claim as new, and desire to secure by Letters Patent is—

A battery electrode provided with a protective coating over the entire surface that is acted upon by the electrolyte, said coating being dry after its application and possessing properties which render it impervious to moisture when the battery is inert but which make it penetrable by the electro-chemical action of the elements when the battery is connected for use.

In testimony whereof I affix my signature.

HERBERT R. PALMER.